United States Patent
Motoyama

(10) Patent No.: US 9,010,482 B2
(45) Date of Patent: Apr. 21, 2015

(54) TRANSMISSION RATIO VARIABLE DEVICE

(71) Applicant: JTEKT Corporation, Osaka-shi, Osaka (JP)

(72) Inventor: Satoshi Motoyama, Knoxville, TN (US)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/074,108

(22) Filed: Nov. 7, 2013

(65) Prior Publication Data

US 2014/0137678 A1    May 22, 2014

(30) Foreign Application Priority Data

Nov. 16, 2012  (JP) ................................. 2012-251937

(51) Int. Cl.
| | | |
|---|---|---|
| *B62D 5/04* | (2006.01) | |
| *B62D 3/02* | (2006.01) | |
| *B62D 5/00* | (2006.01) | |
| *F16H 1/32* | (2006.01) | |
| *F16H 57/00* | (2012.01) | |

(52) U.S. Cl.
CPC ............ *B62D 3/02* (2013.01); *B62D 5/008* (2013.01); *F16H 1/321* (2013.01); *F16H 57/0025* (2013.01)

(58) Field of Classification Search
USPC ........ 180/444, 446, 443; 74/89.17, 89.13, 25, 74/388 PS; 475/169, 162, 166, 164
See application file for complete search history.

(56) References Cited

U.S. PATENT DOCUMENTS

| 8,784,253 | B2 * | 7/2014 | Sasaki et al. ................... 475/150 |
|---|---|---|---|
| 2006/0189430 | A1 * | 8/2006 | Hazama et al. ............... 475/162 |
| 2009/0031852 | A1 * | 2/2009 | Yamamori et al. ............. 74/650 |
| 2010/0179012 | A1 * | 7/2010 | Kuroumaru et al. .......... 475/164 |
| 2014/0165753 | A1 * | 6/2014 | Motoyama ................... 74/89.17 |

FOREIGN PATENT DOCUMENTS

| EP | 2 233 383 A1 | 9/2010 |
|---|---|---|
| JP | A-2006-82718 | 3/2006 |
| JP | A-2010-52508 | 3/2010 |
| JP | A-2010-162947 | 7/2010 |

OTHER PUBLICATIONS

Extended European Search Report issued in European Application No. 13192511.7 issued on May 21, 2014.

* cited by examiner

*Primary Examiner* — Joseph Rocca
*Assistant Examiner* — Marlon Arce
(74) *Attorney, Agent, or Firm* — Oliff PLC

(57) ABSTRACT

A knurled press-fitting portion and an annular groove, which receives foreign matter and is formed to extend in a circumferential direction in front of the press-fitting portion of a cylindrical protruding portion, are provided at an outer peripheral surface of the protruding portion of an output shaft. A fitting portion, which is fitted to a coupling tube by press-fitting, is formed at an outer periphery of an opening end of the protruding portion. An outer peripheral surface of the cylindrical fitting portion and an inner peripheral surface of the cylindrical coupling tube coupled to a Z4 gear are fitted and coupled to each other. The annular groove is closed by the fitting portion in a state where the protruding portion and the coupling tube are coupled to each other. The annular groove is configured so as to prevent foreign matter from being discharged toward a bearing gear.

3 Claims, 2 Drawing Sheets

TRANSMISSION RATIO VARIABLE DEVICE

INCORPORATION BY REFERENCE

This application claims priority to Japanese Patent Application No. 2012-251937 filed on Nov. 16, 2012 the disclosure of which, including the specification, drawings and abstract, is incorporated herein by reference in its entirety.

BACKGROUND OF THE INVENTION

1. Field of the Invention

The invention relates to a transmission ratio variable device.

2. Description of the Related Art

In related art, various transmission mechanisms using gears are known. A transmission mechanism, which can obtain a large speed reducing ratio with a small number of components and have large transmission capacity, is desired. As the transmission mechanism, there have been proposed a transmission ratio variable device in which rotation based motor driving is added to the rotation of an input shaft based on a steering operation, using a differential mechanism so as to transmit resultant rotation to an output shaft, thereby changing the rotation transmission ratio (steering gear ratio) between the input and output shafts, and a vehicle steering system including the transmission ratio variable device (for example, refer to Japanese Patent Application Publication No. 2006-82718).

In a speed-reducing mechanism of the transmission ratio variable device, a nutation gear mechanism is provided as a differential mechanism. The nutation gear mechanism includes a first gear that rotates together with an input shaft, a fourth gear that rotates together with an output shaft, and a nutation gear. The nutation gear includes a second gear that meshes with the first gear, and a third gear that meshes with the fourth gear, and the nutation gear rotates around an axis that inclines with respect to the axes of the first and fourth gears. The nutation gear is configured so as to rotate according to differences in the number of teeth between the first gear and the second gear that mesh with each other and between the fourth gear and the third gear that mesh with each other, while oscillating in the direction of the axis of the input shaft via a bearing. The nutation gear reduces the speed of the rotation input from the input shaft, and transmits the rotation, whose speed has been reduced, to the output shaft, and the nutation gear is rotated by driving means to change the rotation transmission ratio between the input shaft and the output shaft.

In the above-described transmission ratio variable device, for example, when a coupling portion between the input shaft or the output shaft and a gear of the speed reducer is formed by cylindrical surfaces, knurling press-fitting may be used as a fastening method due to constraints imposed on the physical size of the device in terms of mounting. A knurled shaft is press fitted into a hole. However, the knurling press-fitting is performed while an inner peripheral surface of a cylindrical component is shaved off. Thus, there is a possibility that chips may be generated and the generated chips may hinder the rotation of a bearing or a gear at the speed reducer-side, as foreign matter.

SUMMARY OF THE INVENTION

The invention provides a transmission ratio variable device in which foreign matter generated during the press-fitting of an input shaft or an output shaft can be prevented from being caught in a bearing gear, with a simple configuration.

According to a feature of an example of the invention, a transmission ratio variable device including: an input shaft that is coupled to a steering wheel; a housing that supports the input shaft so that the input shaft is rotatable; a motor that is provided so that a motor output shaft is rotatable relative to the housing; a speed reducer that is coupled to the motor output shaft and outputs a steered angle obtained by reducing a motor rotation angle; and an output shaft that transmits the steered angle output from the speed reducer to steered wheel, wherein the speed reducer includes: a first gear that is provided so as to be rotatable together with the input shaft and includes first teeth formed at an end face of the first gear; a fourth gear that is provided so as to be rotatable together with the output shaft and includes fourth teeth formed at an end face of the fourth gear, the end face of the fourth gear facing the end face of the first gear; an inclination shaft that is provided so as to incline with respect to the input shaft; and a nutation gear that is supported by the inclination shaft so that the nutation gear is rotatable, the nutation gear including a second gear and a third gear that have second and third teeth, respectively, the second and third teeth being formed at different end faces of the nutation gear so as to mesh with the first and fourth gears, respectively, and the nutation gear rotating according to a difference in the number of teeth between the first or fourth gear and the second and third gears while oscillating in an axial direction of the input shaft, between the first and fourth gears due to rotation of the inclination shaft, and wherein the output shaft includes a cylindrical protruding portion press-fitted into an opening end of a cylindrical coupling tube that is coupled to the fourth gear so as to be rotatable together with the fourth gear, and a knurled press-fitting portion and an annular groove are provided at an outer peripheral surface of the protruding portion, the annular groove being formed to extend in a circumferential direction at a position in front of the press-fitting portion in a press-fitting direction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
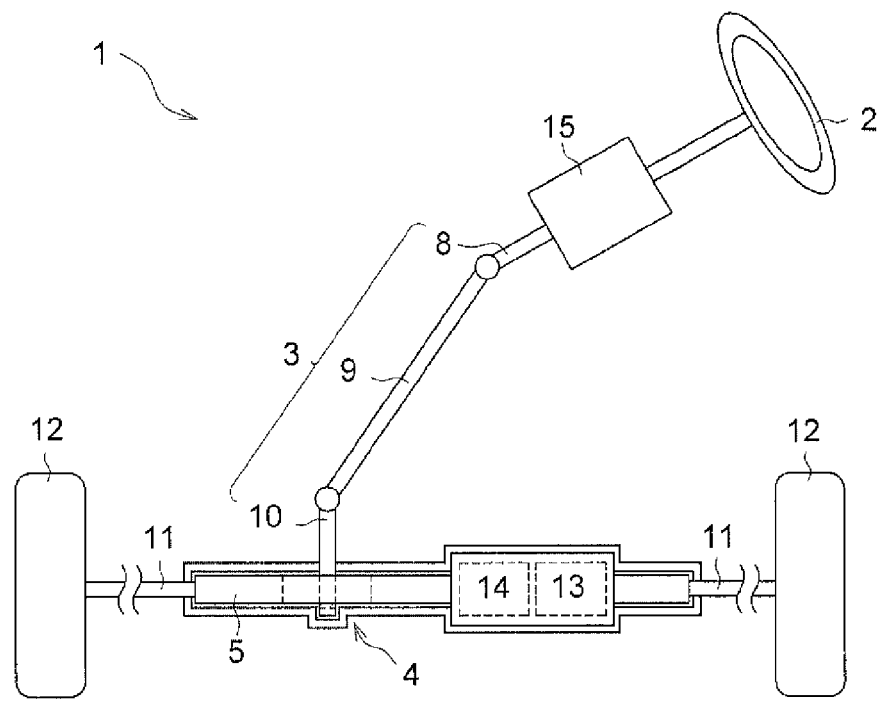
FIG. 1 is a schematic view showing the schematic configuration of a vehicle steering system including a transmission ratio variable device according to an embodiment of the invention.
Figure 2:
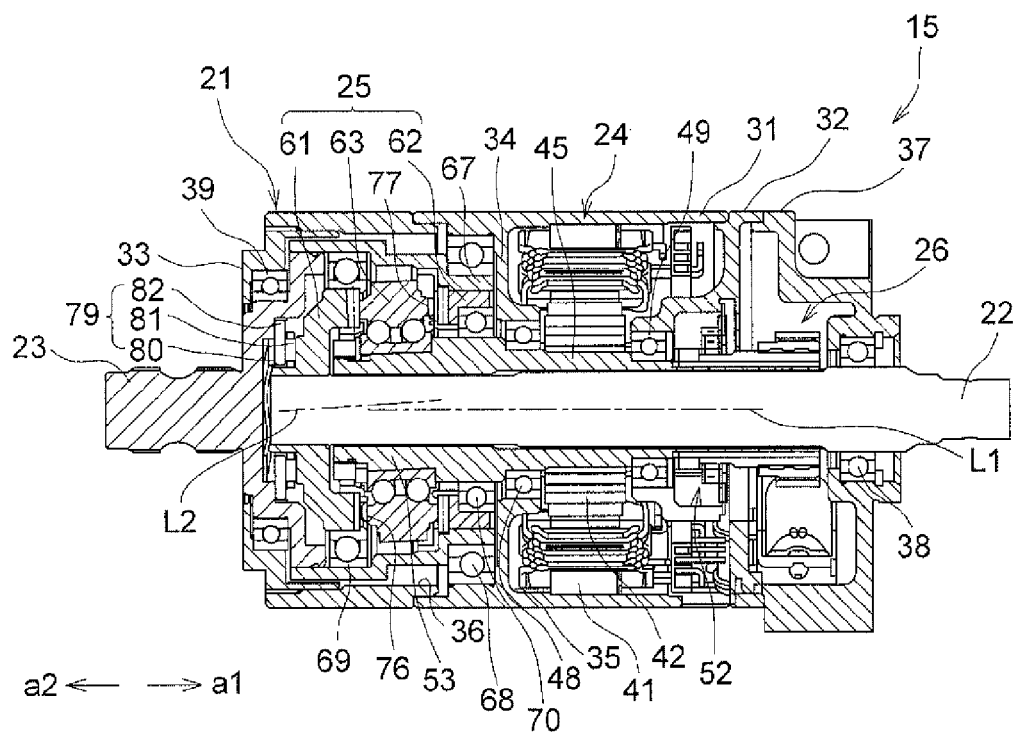
FIG. 2 is a sectional view of the transmission ratio variable device according to the embodiment of the invention.

A transmission ratio variable device provided in a vehicle according to an embodiment of the invention will be described with reference to the drawings. FIG. 1 is a schematic view showing the schematic configuration of a vehicle steering system 1 including a transmission ratio variable device 15 according to an embodiment of the invention, and FIG. 2 is a sectional view of the transmission ratio variable device 15 according to the embodiment of the invention. As shown in FIG. 1, in the vehicle steering system 1, a steering shaft 3 to which a steering wheel 2 is fixed is coupled to a rack shaft 5 via a rack-and-pinion mechanism 4. Accordingly, the rotation of the steering shaft 3 due to a steering operation is converted to the reciprocating linear motion of the rack shaft 5 by the rack-and-pinion mechanism 4. The steering shaft 3 is configured by connecting a column shaft 8, an intermediate shaft 9, and a pinion shaft 10. As the reciprocating linear motion of the rack shaft 5 due to the rotation of the steering shaft 3 is transmitted to knuckles (not shown) via tie rods 11 coupled to respective ends of the rack shaft 5, the steering angle of steered wheels 12, that is, the traveling direction of a vehicle is changed. The vehicle steering system 1 of the present embodiment is configured as a so-called rack assist type electric power steering system (EPS) in which the rotation of an assisting motor 13 is converted to the reciprocating motion of the rack shaft 5 using a ball screw mechanism 14 to transmit the reciprocating motion, thereby applying the motor torque to a steering system as an assisting force.

In the vehicle steering system 1, the transmission ratio variable device 15 is provided in an intermediate portion of the column shaft 8. The transmission ratio variable device 15 changes the ratio of the steering angle (tire angle) of the steered wheels 12 with respect to the steering angle of the steering wheel 2, that is, the transmission ratio (steering gear ratio). As shown in FIG. 2, the transmission ratio variable device 15 includes a substantially cylindrical housing 21 that is fixed to a vehicle body (not shown) of a vehicle, an input shaft 22 to which the rotation due to the steering operation is input, and an output shaft 23 that is coupled to the intermediate shaft 9 (refer to FIG. 1). The input shaft 22 and the output shaft 23 are supported so as to be rotatable with respect to the housing 21, and constitute the above-described column shaft 8 (refer to FIG. 1). That is, the housing 21 serves as a non-rotational member that is not rotated by the rotation of the input shaft 22. The transmission ratio variable device 15 includes a motor 24 that is housed within the housing 21, and a bearing gear (speed reducer) 25 as a differential mechanism. In the transmission ratio variable device 15, the rotation based on motor driving is added to the rotation of the input shaft 22 using the bearing gear 25 so as to transmit resultant rotation to the output shaft 23. Moreover, the transmission ratio variable device 15 includes a lock mechanism 26 that is able to lock the rotation of the motor 24 to mechanically fix the transmission ratio, when necessary.

The housing 21 includes a cylindrical housing body 31 that houses the motor 24, an annular upper cover 32 that covers one axial end side (a right side, i.e., an arrow a1-side in FIG. 2) of the housing body 31, and an annular lower cover 33 that houses the bearing gear 25 and covers the other axial end side (a left side, i.e., an arrow a2-side in FIG. 2) of the housing body 31. An annular partition wall portion 34 that extends radially inward is formed at substantially the center of the housing body 31. A portion on the arrow a1-side of the partition wall portion 34 serves as a motor housing portion 35 that houses the motor 24, and a portion on the arrow a2-side of the partition wall portion 34 serves as a gear housing portion 36 that houses the bearing gear 25. The housing 21 includes a bottomed cylindrical lock case 37 that is fixed to the arrow a1-side of the upper cover 32. The lock mechanism 26 is housed in the lock case 37. The input shaft 22 is rotatably supported by a bearing 38 provided at the bottom of the lock case 37, and the output shaft 23 is rotatably supported by a bearing 39 provided at the lower cover 33. The input shaft 22 and the output shaft 23 are arranged coaxially with each other.

The motor 24 is configured as a brushless motor including a stator 41 that is fixed within the motor housing portion 35, and a rotor 42 that is rotatably provided inside the stator 41. A motor rotary shaft (motor output shaft) 45 is formed in a hollow shape, and the input shaft 22 is coaxially inserted through the inside of the motor rotary shaft 45. The axial length of the motor rotary shaft 45 is set to be longer than the axial length of the motor housing portion 35. A shaft end portion of the motor rotary shaft at the arrow a1-side is arranged within the lock case 37 and a shaft end portion of the motor rotary shaft at the arrow a2-side is arranged within the gear housing portion 36. The motor rotary shaft 45 is rotatably supported by a bearing 49 provided at the upper cover 32, and a bearing 48 provided at the partition wall portion 34. A housing recess recessed toward the motor housing portion 35 is formed at the center of the upper cover 32, and a rotation angle sensor 52 (for example, a resolver) that detects the rotation angle of the rotor 42 is housed within the housing recess.

As shown in FIG. 2, an inclination shaft 53 is formed at the shaft end portion of the motor rotary shaft 45 at the arrow a2-side so that the inclination shaft 53 is rotatable together with the motor rotary shaft 45. The inclination shaft 53 has a shaft center L2 that inclines with respect to a shaft center L1 of the motor rotary shaft 45 (a shaft center of the input shaft 22 and the output shaft 23). An outer peripheral surface of the inclination shaft 53 is formed in a cylindrical shape that inclines with respect to the shaft center L1.

The bearing gear 25 includes a Z1 gear (first gear) 61 that is coupled to the input shaft 22 so as to be rotatable together with the input shaft 22, a Z4 gear (fourth gear) 62 that is coupled to the output shaft 23 so as to be rotatable together with the output shaft 23, and a center bearing (nutation gear) 63 that is arranged between the Z1 gear 61 and the Z4 gear 62 and is coupled to the motor rotary shaft 45 via the inclination shaft 53.

The Z1 gear 61 is formed in a disc shape, and a plurality of first teeth that protrude toward the arrow a1-side are arranged in a circumferential direction at an outer peripheral edge of the Z1 gear 61. In the present embodiment, each of the first teeth is arranged radially with respect to the Z1 gear 61, and is constituted by a columnar roller that is provided so as to be rotatable around an axis thereof. A through hole that extends through the Z1 gear 61 in an axial direction is formed at the center of the Z1 gear 61. The Z1 gear 61 is coaxially coupled to the input shaft 22 so as to be rotatable together with the input shaft 22, as the shaft end portion of the input shaft 22 is serration-fitted to the through hole. That is, the shaft center of the Z1 gear 61 coincides with the shaft center L1 of the motor rotary shaft 45.

The Z4 gear 62 is formed in an annular shape, and a plurality of fourth teeth that protrude toward the arrow a2-side are arranged in the circumferential direction at the Z4 gear 62. In the present embodiment, each of the fourth teeth is arranged radially with respect to the Z4 gear 62, and is constituted by a columnar roller that is provided so as to be rotatable around an axis thereof, as in the case of the Z1 gear 64. The Z4 gear 62 is fixed to an inner periphery of a coupling tube 67 that is a coupling member formed in a cylindrical shape and fixed to the Z4 gear 62. The Z4 gear 62 is coupled to the output shaft 23 via the coupling tube 67. The coupling tube 67 is rotatably supported by a bearing 68 provided adjacent to the arrow a2-side of the partition wall portion 34. The coupling tube 67 is coaxially coupled to the output shaft 23 so as to be rotatable together with the output shaft 23. That is, the Z4 gear 62 is coaxially coupled to the output shaft 23 via the coupling tube 67 so that the Z4 gear 62 is rotatable together with the output shaft 23, and the shaft center of the Z4 gear 62 coincides with the shaft center L1 of the motor rotary shaft 45.

Bearings 69 and 70 are interposed between the coupling tube 67 and the Z1 gear 61 and between the inclination shaft 53 and the Z4 gear 62, respectively.

The center bearing 63 includes a cylindrical inner ring, a cylindrical outer ring gear, and a ball that is interposed between the inner ring and the outer ring gear. A plurality of second teeth that are able to mesh with the first teeth are arranged in the circumferential direction at an end face of the outer ring gear at the arrow a2-side (Z1 gear 61-side). On the other hand, a plurality of third teeth that are able to mesh with the fourth teeth are arranged in the circumferential direction at an end face of the outer ring gear at the arrow a1-side (Z4 gear 62-side). That is, the Z2 gear (second gear) 76 and the Z3 gear (third gear) 77 are constituted by the outer ring gear. In the present embodiment, the number N1 of the first teeth is set so as to be smaller than the number N2 of the second teeth by one, and the number N3 of the third teeth is set so as to be equal to the number N4 of the fourth teeth. For example, in the case where the number N1 is 19, the number N2 is 20, the number N3 is 20, and the number N4 is 20, the speed reducing ratio of the motor rotary shaft 45 and the output shaft 23 at this stage is set to 20.

The inner ring is coupled to an outer periphery of the inclination shaft 53 by a fixing member fixed to an end portion of the inclination shaft 53 at the arrow a2-side so that the inner ring is rotatable together with the motor rotary shaft 45. That is, the shaft center of the center bearing 63 coincides with the shaft center L2 of the inclination shaft 53, and the center bearing 63 rotates around an axis that inclines with respect to the axes of Z1 and Z4 gears 61 and 62. In the outer ring gear, only a portion of the Z2 gear 76 meshes with the Z1 gear 61, and only a portion of the Z3 gear 77 meshes with the Z4 gear 62. A meshing portion between the Z1 gear 61 and the Z2 gear 76 and a meshing portion between the Z4 gear 62 and the Z3 gear 77 are apart from each other by approximately 180° around the shaft centers of the Z1 and Z4 gears 61 and 62.

A stepped bearing receiving portion is formed at a back face of the Z1 gear 61. In a thrust supporting portion (shoulder) of the output shaft 23, the Z1 gear 61 is supported at the bearing receiving portion by a needle bearing 81 and a plate 82 for a rolling surface of the needle bearing 81 so that the Z1 gear 61 is rotatable. A wave washer 80 made of an elastic member is provided at a gap between the output shaft 23 and the plate 82. The wave washer 80 presses the plate 82, the needle bearing 81, and the Z1 gear 61 toward the center bearing 63 in the axial direction. Thus, a preload is applied to the bearing gear 25.

In the bearing gear 25 to which each of the input shaft 22, the output shaft 23, and the motor rotary shaft 45 is coupled, the rotation of the input shaft 22 is transmitted from the Z1 gear 61 to the Z4 gear 62 via the center bearing 63, and is transmitted to the coupling tube 67 and the output shaft 23. When the motor 24 is driven to rotate the motor rotary shaft 45, the inclination shaft 53 coupled to the motor rotary shaft 45 makes a precessional motion. Accordingly, the outer ring gear makes a precessional motion together with the inner ring fixed to the inclination shaft 53, and the meshing portion between the Z1 gear 61 and the Z2 gear 76 and the meshing portion between the Z4 gear 62 and the Z3 gear 77 rotate in the same direction. As a result, a rotation difference based on differences in the number of teeth between the Z1 gear 61 and the Z2 gear 76 and between the Z4 gear 62 and the Z3 gear 77, in other words, the rotation based on motor driving is added to the rotation of the input shaft 22, and the resultant rotation is transmitted to the output shaft 23 (for example, in the case where the speed reducing ratio is 20, one rotation is added to the rotation of the output shaft 23 when the motor rotary shaft 45 makes 20 rotations). That is, the rotation transmission ratio between the input shaft 22 and the output shaft 23, that is, the transmission ratio (steering gear ratio) between the steering wheel 2 (refer to FIG. 1) and the steered wheels 12 (refer to FIG. 1) is changed according to the rotation based on motor driving.

Figure 3:
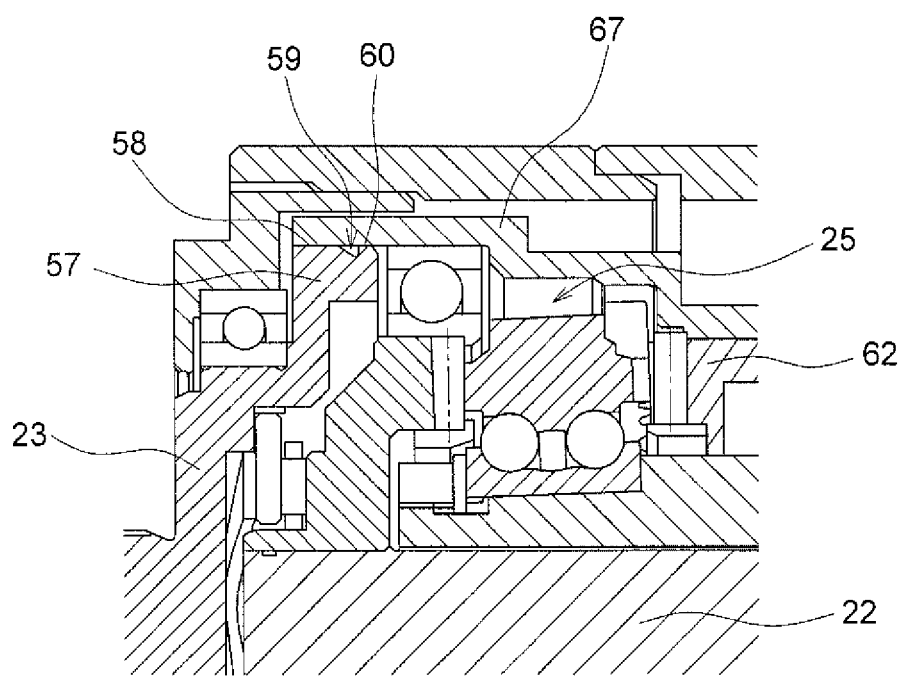
FIG. 3 is an enlarged sectional view of a coupling portion of an output shaft in FIG. 2.

FIG. 3 is an enlarged sectional view of a coupling portion (protruding portion 57) of the output shaft 23 in FIG. 2. As shown in FIG. 3, a knurled press-fitting portion 58 and an annular groove 59 that receives foreign matter are provided at an outer peripheral surface of the cylindrical protruding portion 57 of the output shaft 23. The annular groove 59 is formed to extend in the circumferential direction at a position in front of the press-fitting portion 58 in a press-fitting direction of the protruding portion 57. A fitting portion 60 is formed at an outer periphery of an opening end of the protruding portion 57. The fitting portion 60 is fitted to the coupling tube 67 by press-fitting. An outer peripheral surface of the cylindrical fitting portion 60 and an inner peripheral surface of the cylindrical coupling tube 67 coupled to the Z4 gear 62 are fitted to each other and coupled to each other. The annular groove 59 is closed by the fitting portion 60 in a state where the protruding portion 57 and the coupling tube 67 are coupled to each other. The annular groove 59 is configured so as to prevent foreign matter from being discharged toward the bearing gear 25. Since the outer peripheral surface of the fitting portion 60 and the inner peripheral surface of the coupling tube 67 are fitted to each other, the coaxial accuracy between the input and output shafts 22 and 23 is improved.

The operation and effects of the transmission ratio variable device 15 according to the present embodiment, which is configured as described above, will be described. With the above configuration, the inner peripheral surface of the cylindrical coupling tube 67 coupled to the Z4 gear 62 and the knurled press-fitting portion 58 provided at the outer peripheral surface of the cylindrical protruding portion 57 of the output shaft 23 are fitted to each other by the knurling press-fitting, and the annular groove 59 is formed to extend in the circumferential direction at a position in front of the press-fitting portion 58 in the press-fitting direction of the protruding portion 57 of the output shaft 23. The inner peripheral surface of the coupling tube 67 and the outer peripheral surface of the fitting portion 60 at the opening end of the protruding portion 57 are fitted to each other. When the protruding portion 57 and the coupling tube 67 are coupled to each other, the annular groove 59 is closed by the fitting portion 60.

Accordingly, even if foreign matter is generated by knurling during the press-fitting of the output shaft 23, the foreign matter can be received in the annular groove 59. Moreover, the fitting portion 60 can prevent the foreign matter from being discharged toward the bearing gear 25, and as a result, the bearing and the gear can be prevented from being locked due to the foreign matter being caught therein. For this reason, it is not necessary to provide a seal structure for preventing foreign matter from being discharged toward the bearing gear 25, and thus, it is possible to provide measures against foreign matter at a low cost. By fitting the outer peripheral surface of the fitting portion 60 of the protruding portion 57 and the inner peripheral surface of the coupling tube 67 to each other, the coaxiality between the input shaft 22 and the output shaft 23 can be secured, and centering accuracy can be improved.

As described above, according to the embodiment of the invention, it is possible to provide the transmission ratio variable device in which foreign matter generated during the press-fitting of the input shaft or the output shaft can be prevented from being caught in the bearing gear, with a simple configuration.

Although the embodiment of the invention has been described above, the invention may be realized in other forms.

In the above-described embodiment, the coupling portion between the output shaft 23 and the Z4 gear 62 that forms the bearing gear 25 is provided with the annular groove 59 that receives foreign matter generated during knurling press-fitting. However, the invention is not limited to this, and the annular groove may be provided in a coupling portion between the input shaft 22 and the Z1 gear 61.

In the above-described embodiment, the steering wheel 2 may be coupled to the output shaft 23, and the intermediate shaft 9 may be coupled to the input shaft 22. That is, the input shaft 22 may serve as an output shaft, and the output shaft 23 may serve as an input shaft. The invention is applied to the transmission ratio variable device 15 of a type in which the housing 21 is not rotated by the rotation of the input shaft 22. However, the invention is not limited to this, and may be applied to, for example, a transmission ratio variable device of a type in which the housing is rotated together with the input shaft.

In the above-described embodiment, the invention is applied to the bearing gear type transmission ratio variable device. However, the invention is not limited to this, and may be applied to a wave motion gear type transmission ratio variable device. In addition, the invention is not limited to the column-mounted type transmission ratio variable device, and may be applied to an intermediate shaft-mounted type transmission ratio variable device, and a pinion gear-integrated type transmission ratio variable device.

In the above-described embodiment, the invention is applied to the transmission ratio variable device 15 of the vehicle steering system 1. However, the invention may be applied to other general systems used for applications other than this. In addition, although the vehicle steering system 1 is configured as a rack assist type electric power steering system including a steering assisting mechanism that applies a motor assisting force to the steering shaft 3, the invention is not limited to this, and the vehicle steering system may be a column assist type or pinion assist type electric power steering system, or the steering assisting mechanism may be eliminated.

What is claimed is:

1. A transmission ratio variable device comprising:
   an input shaft that is coupled to a steering wheel;
   a housing that supports the input shaft so that the input shaft is rotatable;
   a motor that is provided so that a motor output shaft is rotatable relative to the housing;
   a speed reducer that is coupled to the motor output shaft and outputs a steered angle obtained by reducing a motor rotation angle; and
   an output shaft that transmits the steered angle output from the speed reducer to a steered wheel,
   wherein the speed reducer includes:
   a first gear that is provided so as to be rotatable together with the input shaft and includes first teeth formed at an end face of the first gear;
   a fourth gear that is provided so as to be rotatable together with the output shaft and includes fourth teeth formed at an end face of the fourth gear, the end face of the fourth gear facing the end face of the first gear;
   an inclination shaft that is provided so as to incline with respect to the input shaft; and
   a nutation gear that is supported by the inclination shaft so that the nutation gear is rotatable, the nutation gear including a second gear and a third gear that have second and third teeth, respectively, the second and third teeth being formed at different end faces of the nutation gear so as to mesh with the first and fourth gears, respectively, and the nutation gear rotating according to a difference in the number of teeth between the first or fourth gear and the second and third gears while oscillating in an axial direction of the input shaft, between the first and fourth gears due to rotation of the inclination shaft, and
   wherein the output shaft includes a cylindrical protruding portion press-fitted into an opening end of a cylindrical coupling tube that is coupled to the fourth gear so as to be rotatable together with the fourth gear, and a knurled press-fitting portion and an annular groove are provided at an outer peripheral surface of the protruding portion, the protruding portion extending substantially in parallel with the output shaft such that the protruding portion is spaced apart from the output shaft in a direction perpendicular to a direction where the output shaft extends, the annular groove being formed to extend in a circumferential direction at a position in front of the press-fitting portion in a press-fitting direction.

2. The transmission ratio variable device according to claim 1, wherein a fitting inner peripheral surface of the coupling tube and a fitting outer peripheral surface of the protruding portion are fitted to each other.

3. The transmission ratio variable device according to claim 1, wherein the protruding portion extends from an end portion of the output shaft toward a direction opposite to a direction where the output shaft extends.

* * * * *